(12) United States Patent
Toyota et al.

(10) Patent No.: US 7,014,241 B2
(45) Date of Patent: Mar. 21, 2006

(54) COMBINATION STRUCTURE OF STORAGE BOX AND CENTER SEAT FOR VEHICLE

(75) Inventors: Minoru Toyota, Hiroshima (JP); Tatsuya Takahashi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/884,280

(22) Filed: Jul. 2, 2004

(65) Prior Publication Data

US 2005/0052044 A1   Mar. 10, 2005

(30) Foreign Application Priority Data

Jul. 2, 2003   (JP)   ............................. 2003-190368
Jul. 2, 2003   (JP)   ............................. 2003-190376

(51) Int. Cl.
*B60N 2/30* (2006.01)
*B60N 3/00* (2006.01)
*B60R 7/04* (2006.01)

(52) U.S. Cl. ............................... 296/37.15; 297/188.1; 224/275

(58) Field of Classification Search ............... 296/37.5, 296/37.8, 37.15; 297/188.1; 224/275
See application file for complete search history.

(56) References Cited

U.S. PATENT DOCUMENTS 1,241,844 A * 10/1917 Gottschall ...................... 220/7

4,733,901 A   3/1988  Okuyama
6,161,896 A   12/2000 Johnson et al.
6,435,587 B1 * 8/2002  Flowerday et al. ........ 296/37.8

FOREIGN PATENT DOCUMENTS

| DE | 199 47 177 A1 | 4/2001 |
| EP | 1 449 710 A2  | 2/2004 |
| JP | 7-040783      | 2/1995 |
| JP | 9-002113      | 1/1997 |
| JP | 2001-130304   | 5/2001 |

* cited by examiner

*Primary Examiner*—Dennis H. Pedder
(74) *Attorney, Agent, or Firm*—Brooks Kushman P.C.

(57) ABSTRACT

Disclosed is a storage box structure for use with a vehicle equipped with first and second seats each of which has a seat cushion and a seatback and which are arranged in the width direction of the vehicle while a given space left therebetween. The storage box structure comprises a storage box provided with a box body with a top opening and formed in a configuration capable of being disposed between the first and second seats in the width direction, and a support mechanism supporting the storage box in such a manner that the storage box can selectively take either one of a use position where the storage box is located between the first and second seats and a retracted position where the storage box is retracted to provide a space between the first and second seats. In a storage box structure allowing a storage box to be disposed between seats, the present invention can assure a walk-through space between the seats as needed.

20 Claims, 11 Drawing Sheets

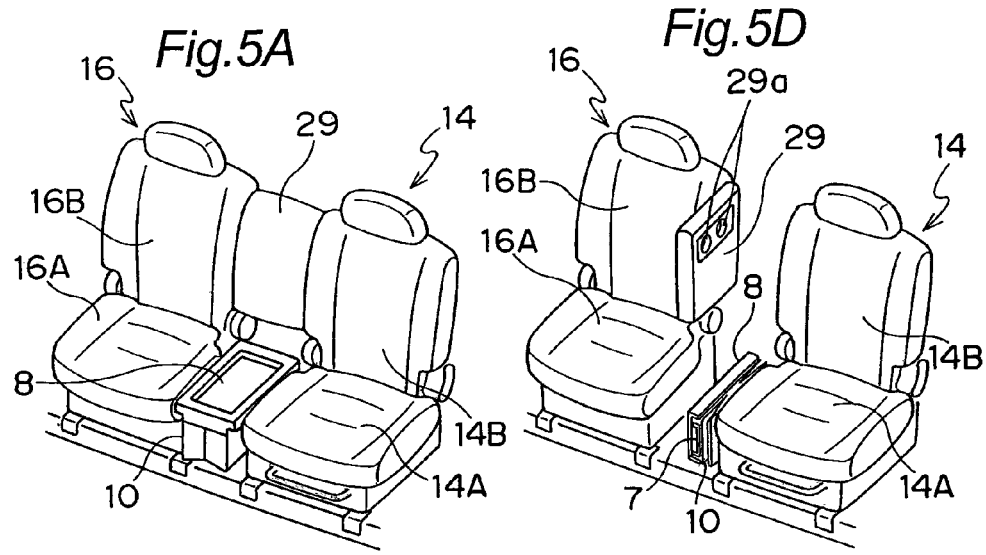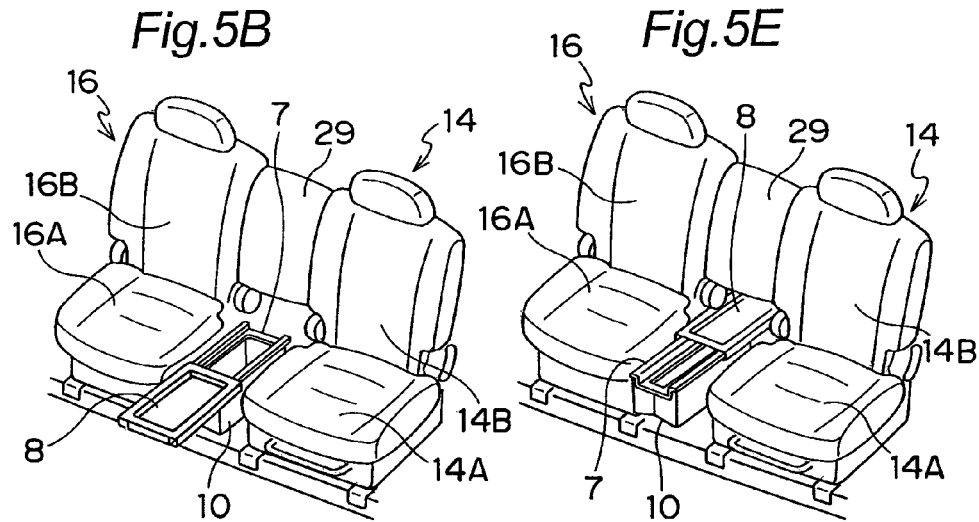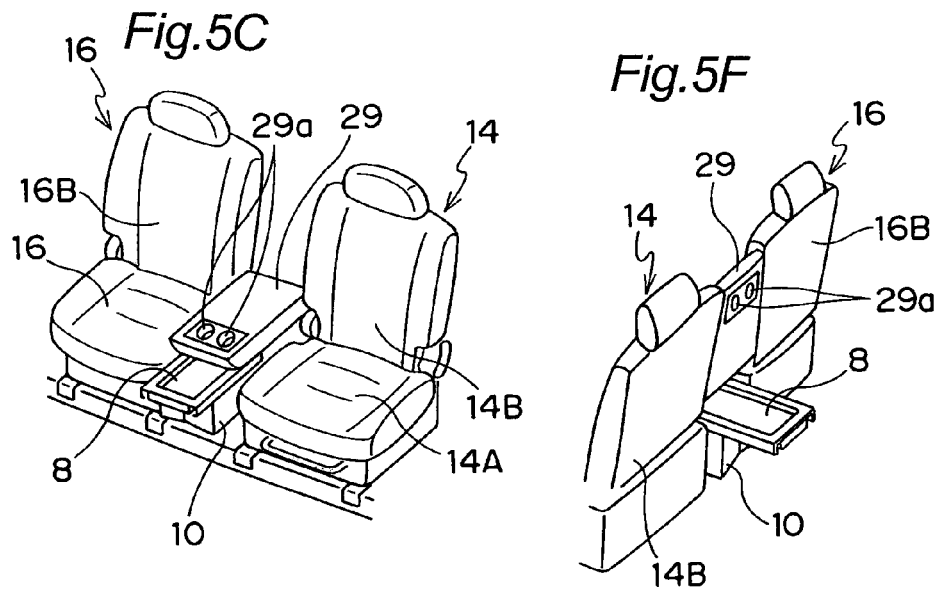

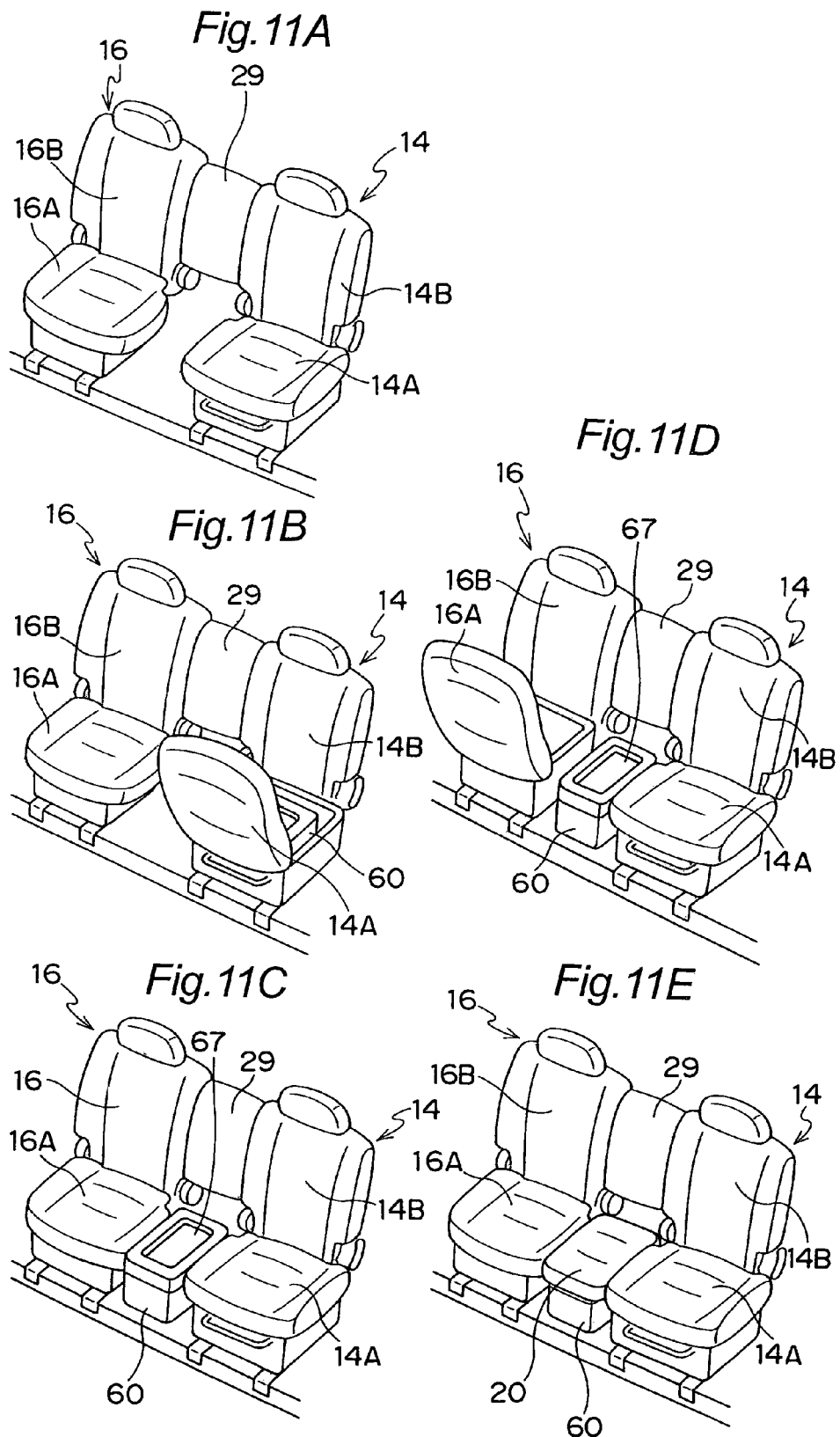

COMBINATION STRUCTURE OF STORAGE BOX AND CENTER SEAT FOR VEHICLE

BACKGROUND OF THE INVENTION

1. Field of the Invention

The present invention relates to a combination structure of storage box and center seat for use with a vehicle, designed to allow a storage box or center seat to be movable between a use position Where the storage box or center seat is located between a pair of seats arranged in the width direction of the vehicle, and a retracted position where the storage box or center seat is retracted in a space under one of the seats.

2. Description of the Related Art

As is well known, a current vehicle includes various devices and structures designed to allow a limited interior space to be effectively used to the full. By way of example, there has been known a structure allowing an auxiliary seat to be used at a position located between a pair of seats, such as rear seats, arranged in the width direction of a vehicle while a given space left therebetween or on the side of one of the seats, and to be retracted in a space under the adjacent seats when the auxiliary seat is not used or when it is desired to assure a walk-through space.

In connection with such a structure, Japanese Patent Laid-Open Publication Nos. 9-2113 and 2001-130304 disclose a vehicle seat structure comprising a main seat, an auxiliary seat, and an auxiliary-seat receiving chamber provided under the seat cushion of the main seat, wherein the seat cushion is supported in such a manner that it is rotationally moved to close and open the top of the receiving chamber, and the auxiliary seat is supported in such a manner that it is rotationally moved between a use position where the auxiliary seat is located on the side of the main seat and a retracted position where the auxiliary seat is located in the receiving chamber.

As one example of a seat structure designed to receive an object other than an auxiliary seat in a space under a seat, Japanese Patent Laid-Open Publication No. 7-40783 discloses a vehicle seat structure comprising a cushion frame supporting a cushion body from its underside, and a baggage storage box having at least two flanges which are provided, respectively, at the top edges of the opposite side surfaces thereof and adapted to engage, respectively, with the top edges of the opposite side frames of the cushion frame, wherein the flanges are brought into engagement with the top edges of the opposite side frames of the cushion frame so as to allow the baggage storage box to be received in a space under the cushion body in a hanging manner on the cushion frame. The storage box may be used as a storage space while being held in the space under the seat, or as a basket after taken out of the space.

There is a longstanding need for using a baggage storage box in the state where an occupant sits down on a seat. As one example for meeting this need, it is conceivable to provide a storage box between a pair of seats arranged in the width direction of a vehicle with a given space left therebetween. On the other hand, there is another longstanding need for assuring a walk-through space between seats to allow an occupant to freely move around the interior space of a vehicle. In order to meet both the above needs, it is required to provide a structure capable of allowing a storage box to be located between seats, and readily assuring a walk-through space between the seats as needed.

Even in the case of providing a baggage storage box between a pair of seats arranged in the width direction of a vehicle while a given space left therebetween so as to meet the need for using the storage box in the state where an occupant sits down on the seat, if a center seat retracted under one of the seats is taken out to the space between the seats, for example, due to the situation of occupants, such as increase in the number of occupants, as disclosed in the aforementioned Japanese Patent Laid-Open Publication Nos. 9-2113 and 2001-130304, the storage box will not be usable.

Therefore, it is desired to provide a structure capable of setting up both the storage box and the center seat between the seats arranged in the vehicle width direction, while maintaining respective intended functionalities of the storage box and the center seat. In this case, it is also desired to allow each of the storage box and the center seat to be set up selectively and readily.

SUMMARY OF THE INVENTION

It is an object of the present invention to provide a storage box structure capable of allowing a storage box to be disposed between a pair of seats, and assuring a walk-through space between the seats as needed.

It is another object of the present invention to provide a combination structure of storage box and center seat capable of readily setting up both or either one of a storage box and a center seat between a pair of seats selectively according to need.

In order to achieve the above objects, according to a first aspect of the present invention, there is provided a storage box structure for use with a vehicle equipped with first and second seats each of which has a seat cushion and a seatback and which are arranged in the width direction of the vehicle while a given space left therebetween. The storage box structure comprises a storage box provided with a box body with a top opening and formed in a configuration capable of being disposed between the first and second seats in the width direction, and a support mechanism supporting the storage box in such a manner that the storage box can selectively take either one of a use position where the storage box is located between the first and second seats and a retracted position where the storage box is retracted to provide a space between the first and second seats. This storage box structure can readily provide a walk-through space to achieve excellent usability.

In the storage box structure set forth in the first aspect of the present invention, the support mechanism may be designed to allow the storage box to be moved below the seat cushion of the first or second seat so as to take the retracted position. This support mechanism makes it possible to retract the storage box out of the way when not used.

The seat cushion of the first or second seat may include a base member defining a receiving space with a top opening to receive the storage box therein, and a seat cushion body designed to be movable to cover the base member from above the base member and support an occupant seated thereon. The seat cushion body may have a front end portion pivoted rotatably about an axis extending along the width direction to open and close the top opening of the receiving space defined by the base member. According to this structure, the receiving space of the storage box can be readily opened by lifting the rear end portion of the seat cushion and rotationally moving the seat cushion about the axis. Thus, the storage box can be relatively readily taken out from the retracted position and retracted from the use position.

The storage box may further include a width change mechanism for narrowing the width of the box body in the width direction when the storage box is in the use position.

The width change mechanism can narrow the width of the storage box even if the storage box is located in the use position. Thus, an adequate walk-through space can be provided between the first and second seats without the operation for retracting the storage box to achieve enhanced usability.

The support mechanism may be designed to allow the storage box to be moved to the retracted position from the use position while maintaining the width of the box body narrowed. According to this structure, the storage box can be formed to have a relatively large size without depending significantly on the limited volume of the receiving space into which the storage box is to be retracted.

In the storage box structure set forth in the first aspect of the present invention, the storage box may include a cover member attached to the box body slidably in the longitudinal direction of the vehicle to open and close the top opening of the box body. The cover member may have a top surface designed to be used as a table when the storage box is in the use position. The top surface of the cover member attached to the box body of the storage box can be conveniently used as a table according to need.

The vehicle may further include a center-seat seatback for a center seat, which is located between the respective seatbacks of the first and second seats. In this case, the center-seat seatback may be pivoted at a lower end thereof to allow the center-seat seatback to be turned down in the frontward direction of the vehicle, and a back surface of center-seat seatback is designed to be used as a table when the center-seat seatback is turned down in the frontward direction. According to this structure, an occupant seated on the first or second seat can use the back surface of the center-seat seatback as a table. Further, the center seat can be used in various manners according to the number of occupants or occupant's preference to achieve enhanced usability.

In the case where the vehicle includes a rear seat disposed at the rear of the first and second seats, the cover member may be designed to be slidingly moved in front of the rear seat. The cover member of the storage box can be used in various manners according to the number of occupants or occupant's preference to achieve enhanced usability. For example, the cover member can be used as a table for an occupant seated on the rear seat.

In order to achieve the above objects, according to a second aspect of the present invention, there is provided a combination structure of storage box and center seat for use with a vehicle equipped with a first seat having a first seat cushion and a first seatback, and a second seat having a second seat cushion and a second seatback, wherein the first and second seat are arranged in the width direction of the vehicle while a given space left therebetween. The combination structure of storage box and center seat comprises a storage box provided with a box body with a top opening and formed in a configuration capable of being disposed between the first and second seats in the width direction, a first support mechanism supporting the storage box in such a maimer that the storage box can selectively take either one of a use position where the storage box is located between the first and second seats and a retracted position where the storage box is located below the first seat cushion, a center seat provided with a seat body for supporting an occupant seated thereon and formed in a configuration capable of being disposed between the first and second seats in the width direction, and a second support mechanism supporting the center seat in such a manner that the center seat can selectively take either one of a use position where the center seat is located between the first and second seats and a retracted position where the center seat is located below the second seat cushion. In the above combination structure of storage box and center seat, both or either one of the storage box and the center seat can be selectively used in various manners according to situations to achieve excellent usability.

In the combination structure of storage box and center seat set forth in the second aspect of the present invention, the second support mechanism may be designed to allow the seat body of the center seat to be moved to a position above the storage box when the storage box is in the use position. According to this structure, even if the first seat is used, for example, an occupant is seated on the first seat, or a child seat is attached to the first seat, the center seat can be used without the operation for retracting the storage box below the first seat to achieve enhanced usability.

The storage box may include a width change mechanism for narrowing the width of the box body in the width direction when the storage box is in the use position. The width change mechanism can narrow the width of the storage box even if the storage box is located in the use position. Thus, an adequate walk-through space can be provided between the first and second seats without the operation for retracting the storage box to achieve enhanced usability.

The first support mechanism may be designed to allow the storage box to be moved to the retracted position while maintaining the width of the box body narrowed in the use position. According to this structure, the storage box can be retracted in the retracted position with the narrowed width of the box body being maintained. Thus, the storage box can be formed to have a relatively large size without depending significantly on the limited volume of the receiving space into which the storage box is to be retracted.

In the combination structure of storage box and center seat set forth in the second aspect of the present invention, the first seat cushion may include a first base member defining a first receiving space with a top opening to receive the storage box therein, and a first seat cushion body designed to be movable to cover the first base member from above the first base member and support an occupant seated thereon. The first seat cushion body may also have a front end portion pivoted rotatably about an axis extending along the width direction to open and close the top opening of the first receiving space defined by the first base member. Further, the second seat cushion may include a second base member defining a second receiving space with a top opening to receive the center seat therein, and a second seat cushion body designed to be movable to cover the second base member from above the second base member and support an occupant seated thereon. The second seat cushion body may also have a front end portion pivoted rotatably about an axis extending along the width direction to open and close the top opening of the second receiving space defined by the second base member. According to this structure, the receiving space of the storage box can be readily opened by lifting the rear end portion of the seat cushion and rotationally moving the seat cushion about the axis. Thus, the storage box can be relatively readily taken out from the retracted position and retracted from the use position.

The storage box may include a cover member attached to the box body slidably in the longitudinal direction of the vehicle to open and close the top opening of the box body. The cover member may have a top surface designed to be used as a table when the storage box is in the use position.

The top surface of the cover member attached to the box body of the storage box can be conveniently used as a table according to need.

The vehicle may further include a center-seat seatback for a center seat, which is located between the respective seatbacks of the first and second seats. In this case, the center-seat seatback may be pivoted at a lower end thereof to allow the center-seat seatback to be turned down in the frontward direction of the vehicle, and a back surface of center-seat seatback is designed to be used as a table when the center-seat seatback is turned down in the frontward direction. According to this structure, an occupant seated on the first or second seat can use the back surface of the center-seat seatback as a table. Further, the center seat can be used in various manners according to the number of occupants or occupant's preference to achieve enhanced usability.

In case where the vehicle includes a rear seat disposed at the rear of the first and second seats, the cover member may be designed to be slidingly moved in front of the rear seat. The cover member of the storage box can be used in various manners according to the number of occupants or occupant's preference to achieve enhanced usability. For example, the cover member can be used as a table for an occupant seated on the rear seat.

Other features and advantages of the present invention will be apparent from the accompanying drawings and from the detailed description.

BRIEF DESCRIPTION OF THE DRAWING

FIG. 5A is a perspective view showing the combination structure of storage box and center seat, wherein the inlet of the storage box in the use position is closed by a cover member.

FIG. 5B is a perspective view showing the combination structure of storage box and center seat, wherein the cover member is slidingly moved frontward to open the inlet of the storage box in the use position.

FIG. 5C is a perspective view showing the combination structure of storage box and center seat, wherein a center-seat seatback is turned down frontward to cover the storage box in the use position.

FIG. 5D is a perspective view showing the combination structure of storage box and center seat, wherein the storage box is folded in the use position and the center-seat seatback is turned toward the second seat to assure a walk-through space.

FIG. 5E is a perspective view showing the combination structure of storage box and center seat, wherein the cover member is slidingly moved rearward to open the inlet of the storage box in the use position.

FIG. 5F is a perspective view showing the first and second seats, and the storage box in FIG. 5E, seeing from an obliquely rearward direction.

FIG. 11A is a perspective view showing the combination structure of storage box and center seat according to the third embodiment, wherein the storage box and center seat are retracted in receiving spaces under first and second seats, respectively.

FIG. 11B is a perspective view showing the combination structure of storage box and center seat according to the third embodiment, wherein a seat cushion of the first seat is lifted to open the receiving space under the first seat, in an operation for taking out the storage box.

FIG. 11C is a perspective view showing the combination structure of storage box and center seat according to the third embodiment, wherein only the storage box is set up in the use position.

FIG. 11D is a perspective view showing the combination structure of storage box and center seat according to the third embodiment, wherein a seat cushion of the second seat is lifted to open the receiving space under the second seat, in an operation for taking out the center seat.

FIG. 11E is a perspective view showing the combination structure of storage box and center seat according to the third embodiment, wherein both the storage box and the center seat are set up in their use positions.

DESCRIPTION OF THE PREFERRED EMBODIMENTS

With reference to the accompanying drawings, an embodiment of the present invention will now be described. The following description will be made in connection with an example where a pair of seats are arranged in the width direction of a vehicle while a given space left therebetween, and on the assumption that these seats are mounted on the vehicle as rear seats in either one of the second row to rearmost row. It should be understood that even through embodiments are separately described, single features thereof may be combined to additional embodiments.

First Embodiment

Figure 1:
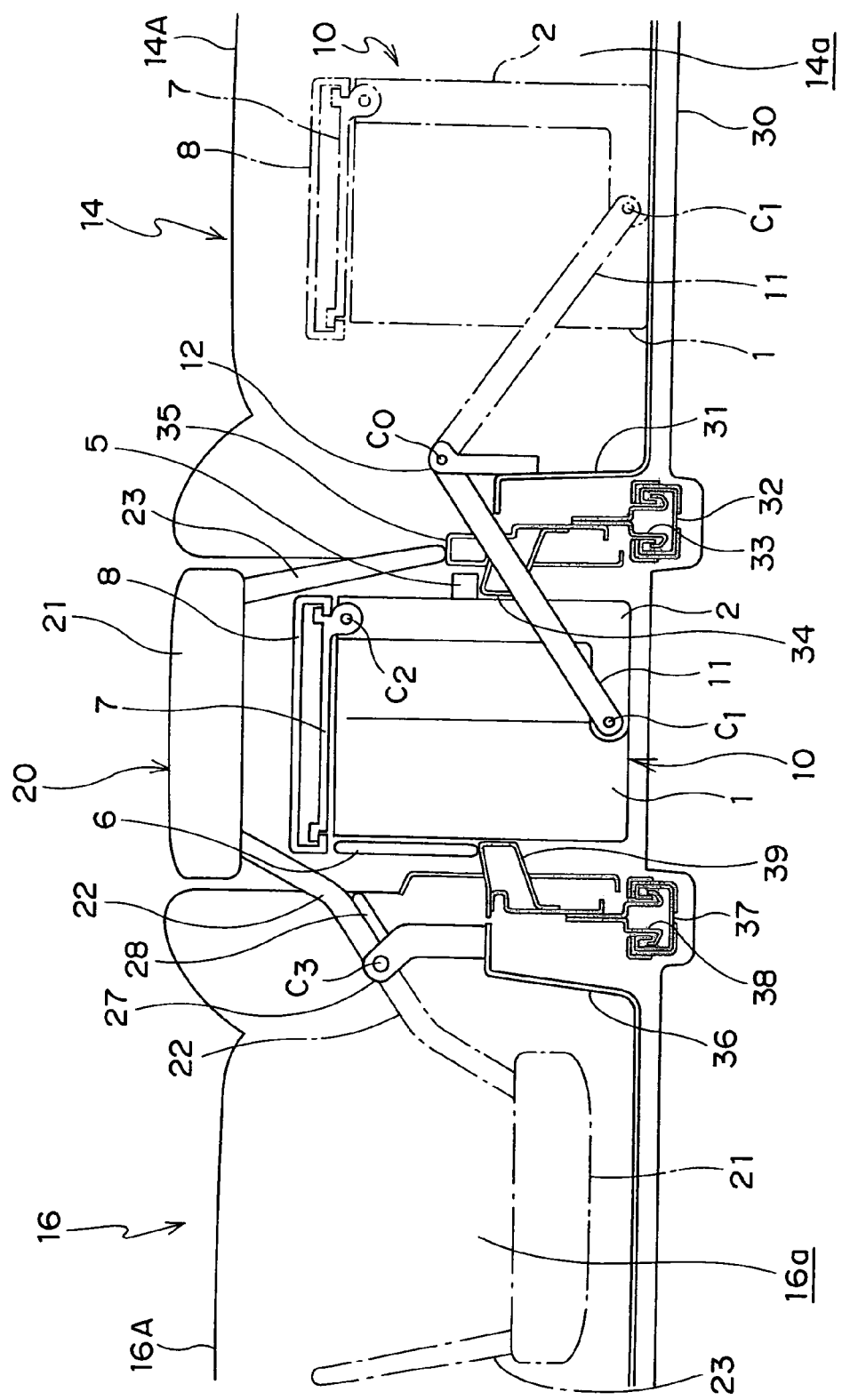
FIG. 1 is an explanatory diagram showing a support mechanism for selectively moving each of a storage box and a center seat to either one of a use position and a retracted position, in accordance with a first embodiment of the present invention.

FIG. 1 is an explanatory diagram showing a support mechanism for selectively moving each of a storage box 10 and a center seat 20 to either one of a use position and a retracted position, in accordance with a first embodiment of the present invention. In FIG. 1, the frontward (near) and rearward (far) sides relative to the surface of the drawing sheet correspond to the frontward and rearward sides in the frontward/rearward direction (or longitudinal direction) of a vehicle, respectively. As used in this specification, the term "use position" means a position where the storage box 10 or the center seat 20 is located between a pair of seats 14, 16 arranged in the width direction of the vehicle while a given space left therebetween, and the term "retracted position" means where the storage box 10 is located in a space 14a under a seat cushion 14A of the seat 14 or the center seat 20 is located in a space 16a under a seat cushion 16A of the seat 16. In FIG. 1, each of the storage box 10 and the center seat 20 in the use position is indicated by solid lines, and each of the storage box 10 and the center seat 20 in the retracted position is indicated by dash-dotted lines. When both the storage box 10 and the center seat 20 are set up in the use position, the center seat 20 is located above the storage box 10 to cover the storage box 10. Further, through means of a given support mechanism, the storage box 10 and the center seat 20 are moved from the use position to get away from each other in the vehicle width direction, and retracted in the individual spaces under the seat cushions 14A, 16A, respectively. In the following description, the seat 14 capable of receiving the storage box 10 therein is referred to as "first seat", and the seat 16 capable of receiving the center seat 20 therein is referred to as "second seat". The right seat and the left seat in FIG. 1 are the first seat 14 and the second seat 16, respectively.

The storage box 10 is connected to the first seat 14 through a pair of link members 11 in such a manner that it can be moved between the use position and the retracted position while being maintained in an approximately horizontal posture. Each of the link members 11 is connected to the lower end portion of corresponding one of the front and rear surfaces of the storage box 10 at one end, and connected to corresponding one of a pair of pivotal support members fixed to a base member 31 defining a part of the space under the seat cushion 14A at the other end (see FIG. 2 for details). Each of the link members 11 is rotatably connected to the storage box 10 and the pivotal support member 12. Thus, in conjunction with the rotational movement of the link members 11 about an axis $C_0$ with respect to the pivotal support members 12, the storage box 10 is moved between the use position and the retracted position in the space 14a under the seat cushion 14A. During this movement, the link members 11 are rotated relatively with respect to the storage box 10 to allow the storage box 10 to be maintained in a horizontal posture.

Each of the seat cushions 14A, 16A of the seats 14, 16 is pivotally supported at front end side to allow each of the seat cushions 14A, 16A to rotate about an axis (not shown) extending along the vehicle width direction. In operations for taking out and retracting the storage box 10 and the center seat 20, the rear end portion of the seat cushion 14A, 16A is lifted to rotationally move the seat cushion about the axis so as to open the space 14a, 16a under the seat cushion.

The center seat 20 comprises a seat body 21 for supporting an occupant seated thereon, and first and second leg members extending from the bottom surface of the seat body 21. The first and second leg members 22, 23 are fixed to the seat body 21 at their one ends. The first leg member 22 is connected to a pivotal support member 27 rotatably about an axis $C_3$ at the other end. The pivotal support member 27 is fixed to a base member 36 defining a part of the space 16a under the seat cushion 16A of the second seat 16. Thus, the center seat 20 is moved in conjunction with the rotational movement of the first leg member 22 relative to the pivotal support member 27. The pivotal support member 27 has a stopper member 28 attached thereto to regulate the rotational movement of the first leg member 22 toward the first seat 14 (or in a direction allowing the seat body 21 to be taken out from the space 16a) during the movement of the center seat 20.

In the use position of the center seat 20, the other end of the second leg member 23 is placed on a center-seat support rail 35 attached to the lower portion of the side surface of the first seat 14 capable of receiving the storage box 10 therein. The center-seat support rail 35 is arranged to support the center seat 20 in the use position in such a manner that the center seat 20 is maintained in an approximately horizontal posture. As compared to the posture in the use position, the center seat 20 in the retracted position is maintained in a reversed posture or a posture where the first and second leg members 22, 23 are located on the upper side of the seat body 21.

As seen from FIG. 1, a floor panel 30 serving as an interior floor of the vehicle is provided with side rails 32, 37 extending in parallel with each other along the longitudinal direction of the vehicle. The lower end portions of the first and second seats 14, 16 are coupled with the side rails 32, 37 via slide rails 33, 38, allowing the seats 14, 16 to slide in the longitudinal direction of the vehicle. When the base members 31, 36 are moved in conjunction with the sliding movement of the first and second seats 14, 16, the storage box 10 and the center seat 20 are also moved in the longitudinal direction of the vehicle.

In FIG. 1, both the storage box 10 and the center seat 20 in FIG. 1 are disposed between the first and second seats 14, 16. However, only either one of the storage box 10 and the center seat 20 can be selectively set up in the use position, for example, according to the situation of occupants, such as the number of occupants or occupant's choice.

Figure 2:
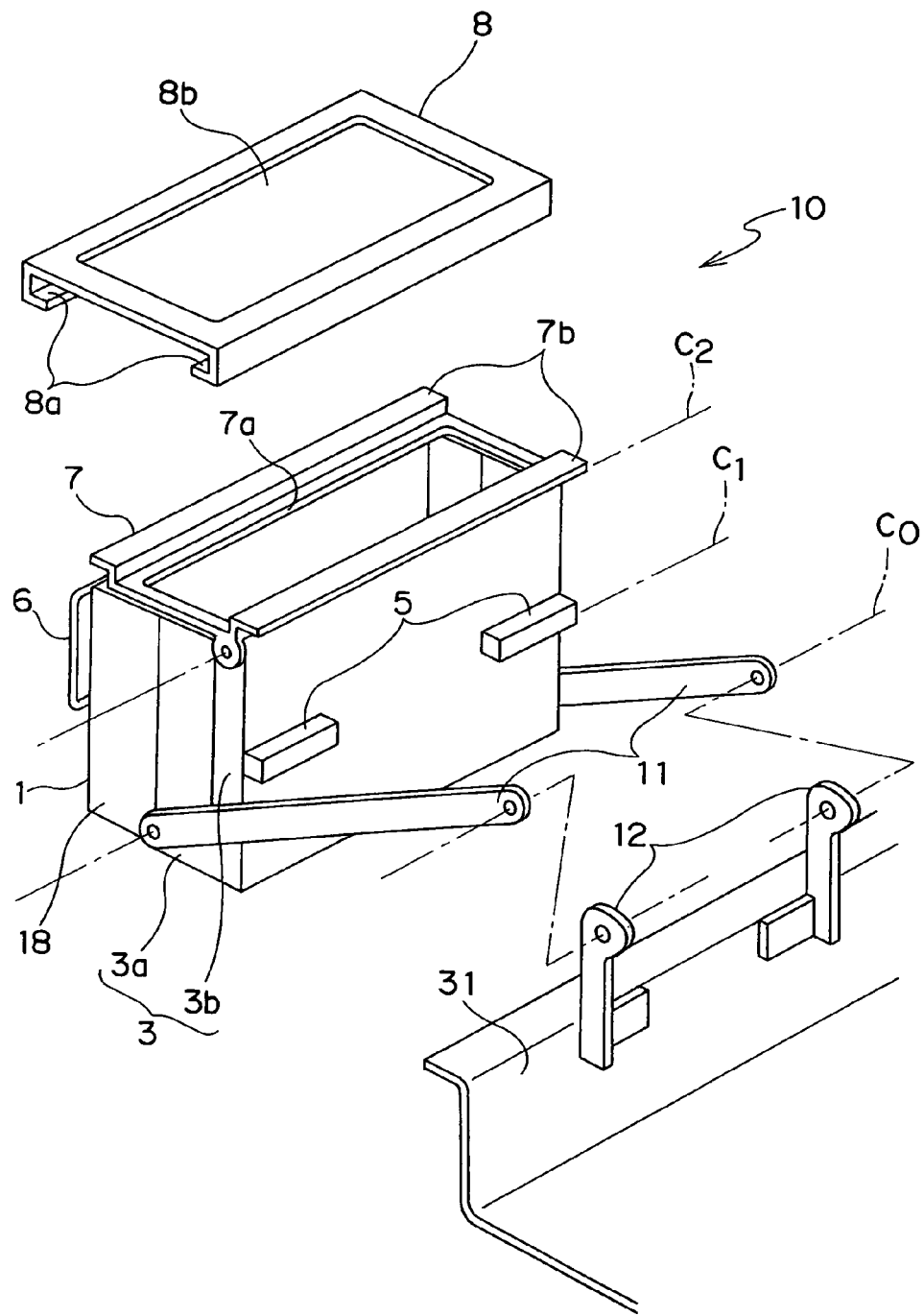
FIG. 2 is a perspective view showing the storage box and a structure for connecting the storage box to a first seat.

FIG. 2 is a perspective view showing the storage box 10 and the structure for connecting the storage box 10 to the first seat 14. In FIG. 2, the lower left and upper right sides of the drawing sheet correspond to the frontward and rearward sides of the vehicle. The storage box 10 comprises a box body 1 including a rectangular parallelepiped-shaped cloth housing 18 with a top opening and an approximately rectangular frame 19 (see FIG. 3) attached to the housing 18 along the periphery of the opening thereof. The frame 19 has a foldable structure in each of the opposite side edges thereof extending along the vehicle width direction. Thus, the box body can also be folded and narrowed in the vehicle width direction by folding the foldable structure of the frame 19. The material of the housing of the box body 1 is not limited to cloth, but any other suitable material allowing the box body 1 to be folded and narrowed in the vehicle width direction, for example resin materials, may be used.

As seen from FIG. 2, the storage box 10 also includes a support member 2 serving as a member for supporting the box body 1. The support member 2 has a pair of first side surfaces 3 extending, respectively, on the front and rear sides of the box body 1, and a second side surface 4 connecting the first side surfaces 3. When the storage box 10 is in the use position, the second side surface 4 is located in opposed relation to the first seat 14. The first front and rear side surfaces 3 are formed, respectively, in an approximately reverse-L shape and an approximately L shape in front view each of which comprises a horizontal portion 3a and a vertical portion 3b. Each of the one ends of the link members 11 is rotatably connected to the terminal end region of the horizontal portion 3a of the corresponding first side surface 3. An opening member 7 extending along the periphery of the opening of the box body 1 is connected to the respective terminal end (top end) regions of the vertical portions 3b of the first side surfaces 3 in such a manner that it is rotationally moved about an axis (indicated by $C_2$ in FIG. 2) extending along the longitudinal direction of the vehicle.

As seen from FIG. 2, the opening member 7 has an opening portion 7a defining the inlet of the storage box 10, and a pair of flanges 7b extending along the opposite side edges of the opening portion 7a extending in the longitudinal direction of the vehicle, respectively. The flanges 7b are provided to allow a cover member 8 for opening and closing the inlet (the opening portion 7a of the opening member 7) of the storage box 10 to be attached to the opening member 7. Correspondingly, the opposite side edges of the cover member 8 extending in the longitudinal direction of the vehicle are folded back to form a pair of channels 8a for receiving the corresponding flanges 7b therein. The cover member 8 is attached to the opening member 7 while receiving the flanges 7b of the opening member 7 in the corresponding channels 8a, so that cover member 8 can be slidingly moved in the longitudinal direction of the vehicle. The cover member 8 attached to the opening member 7 can be used as a table. From this point of view, the top surface of the cover member 8 is formed with a depressed portion 8b for preventing an object placed on the top surface of the cover member 8 from slipping off.

The opening member 7 rotatably connected to the support member 2 is maintained in a horizontal posture on the box body 1 (see FIG. 2), and then can be rotated about the axis $C_2$ to take a position where it is located along the second side surface 4 of the support member 2 while sandwiching the box body 1 folded to have a narrowed width in the vehicle width direction in cooperation with the support member 2 (see FIG. 5D). In conjunction with this rotational movement of the opening member 7, the cover member 8 is rotationally moved together with the opening member 7 while maintaining its attached state to the opening member 7.

The second side surface 4 of the support member 2 is formed with positioning ribs 5 extending horizontally. As seen from FIG. 1, when the storage box 10 is in the use position, the positioning ribs 5 are placed on a support rail 34 horizontally extending on the lower portion of the side surface of the first seat 14 capable of receiving the storage box 10 therein. Further, a positioning frame 6 having a lower edge extending horizontally is attached to the box body 1 on one of the side surfaces of the box body 1 that does not directly face the second side surface 4 of the support member 2 (or attached to the side surface of the box body 1 far from the first seat 14). When the storage box 10 is in the use position, the lower edge of the positioning frame 6 is placed on a support rail 39 horizontally extending on the lower portion of the side surface of the second seat 16 capable of receiving the center seat 20 therein. The storage box 10 in the use position can be supported in the horizontal posture by placing the positioning ribs 5 and the positioning frame 6 on the corresponding support rails 34, 39.

Figure 3:
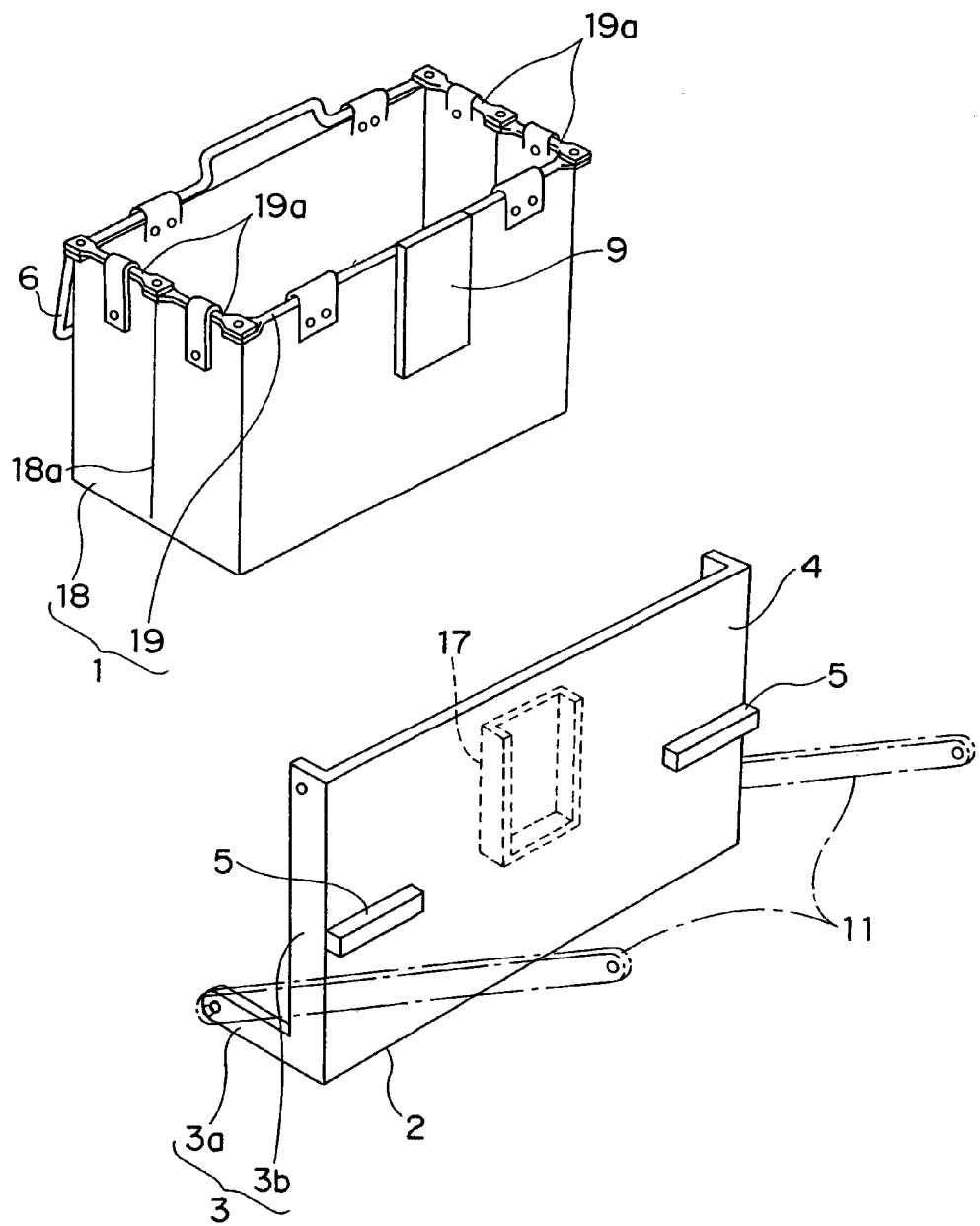
FIG. 3 is a perspective view showing a structure for attaching a box body to a support member.

With reference to FIG. 3, a structure for attaching the box body 1 to the support member 2 will be described below. In FIG. 3, the opening member 7 to be connected to the vertical portions 3b of the first side surfaces 3 of the support member 2 is omitted. As seen from FIG. 3, the side surface of the box body 1 opposed to the support member 2 is provided with an insertion member 9 having a top end fixed to the frame 19 of the box body 1 and a lower free end and extending downward from the top end to the lower free end. Correspondingly, the side surface of second side surface 4 on the support member 2, which is opposed to the box body 1, is provided with a pocket 17 having an opening for receiving the insertion member 9 of the box body 1 from above the pocket 17. The box body 1 can be attached to the support member without wobbling movement or loosening by inserting the insertion member 9 of the box body 1 into the pocket 17 of the support member 2.

Further, as seen from FIG. 3, in the frame 19 of the box body 1, each of the side edges extending along the vehicle width direction among the edges constructing an approximately rectangular shape is composed of two bars 19a. These bars 19a are rotatably connected with each other so that each of the side edges of the frame 19 along the vehicle width direction can be folded. When the side edges along the vehicle width direction are folded in the inward direction of the opening, the rectangular parallelepiped-shaped cloth housing 18 is simultaneously folded. Thus, the box body 1 is folded to have a narrowed width in the vehicle width direction. In order to facilitate the folding operation, a crease 18a is formed in the rectangular parallelepiped-shaped cloth housing 18 in advance.

The folding structure of the box body 1 is not limited to the above structure, but any other suitable folding structure may be used.

In the above storage box 10, the folding operation is completed by folding the box body 1 to have a narrowed width in the vehicle width direction, and then rotationally moving the opening member 7 and the cover member 8 to a position where they are located along the second side surface 4 of the support member 2 while sandwiching the box body 1 in cooperation with the support member 2. The storage box 10 can be adequately held in the folded state without spread by the dead weights of the opening member 7 and the cover member 8. In order to maintain the folded state of the storage box 10 in the folded state more reliably, holding means, such as a pair of clips engageable with each other, may be provided between the opening member 7 and the support member 2.

Figure 4A:
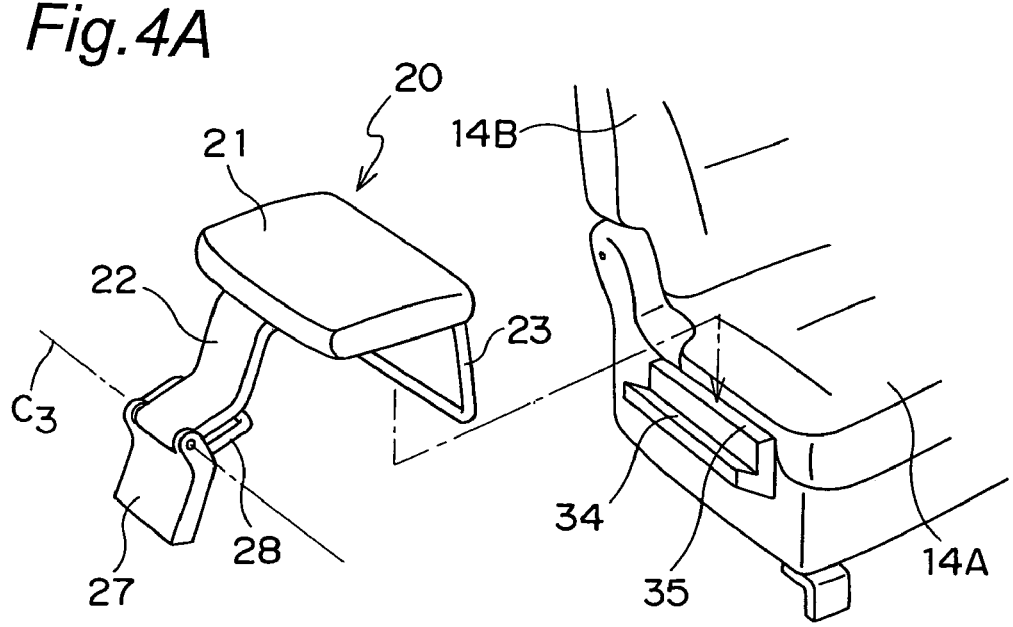
FIG. 4A is a perspective view showing a support structure for the storage box and the center seat, which is provided at the lower portion of the side surface of the first seat.
Figure 4B:
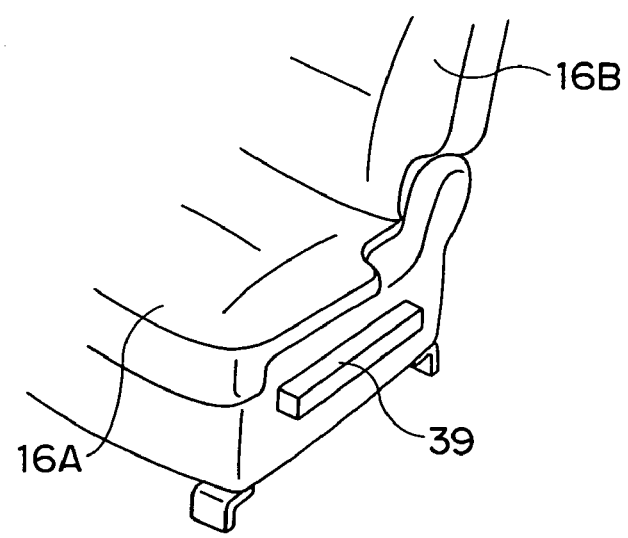
FIG. 4B is a perspective view showing a support structure for the storage box, which is provided at the lower portion of the side surface of a second seat.

With reference to FIGS. 4A and 4B, a storage box/center seat support structure provided at the lower portion of the side surface of the first seat 14, and a storage box/center seat support structure provided at the lower portion of the side surface of the second seat 16 will be described below. As seen from FIG. 4A, the storage-box support rail 34 is provided at the lower portion of the side surface of the first seat 14 to extend approximately horizontally, and the the center-seat support rail 35 is provided on the upper side of the storage-box support rail 34 to extend approximately horizontally. The storage-box support rail 34 is formed such that it protrudes from the first seat 14 outward more than the center-seat support rail 35. As described above, the center seat 20 in the use position is held in the approximately horizontal posture by placing the center seat 20 on the center-seat support rail 35.

Further, as seen from FIG. 4B, the storage box support rail 39 is provided at the lower portion of the side surface of the second seat 39 to extend approximately horizontally. As described above, when the storage box 10 is in the use position, the lower edge of the positioning frame 6 provided at the side surface of the storage box 10 is placed on the storage-box support rail 39.

FIGS. 5A to 5F show various use modes of the storage box 10 in the use position where it is located between the first seat 14 and the second seat 16. As seen from these figures, a seatback 29 for the center seat 20 (not shown in FIG. 5) is disposed between a seatback 14B of the first seat 14 and a seatback 16B of the second seat 16. In this embodiment, the center-seat seatback 29 is connected to and pivotally supported by the seatback 16B of the second seat 16 in such a manner that it can be rotationally moved about an axis extending along its side surface, and can be rotationally moved about another axis extending along its lower edge. The connection portion may be provided with a lock mechanism (not shown) for restraining the rotational movement to hold the seatback 29 for the center seat 20 at a given rotational angle. For this purpose, any conventional connection mechanism may be used. The back surface of the seatback 29 is provided with a cup holder 29a usable when the seatback 29 takes a position where it is turned down frontwardly.

In the state illustrated in FIG. 5A, the storage box 10 is closed by the cover member 8. In this state, the top surface of the cover member 8 can be used as a table surface. In the state illustrated in FIG. 5B, the cover member 8 is moved frontward to open the storage box 10.

In the state illustrated in FIG. 5C, the seatback 29 for the center seat 20 is turned down frontward to cover the storage box 10 from above the storage box 10. In this state, the coup holder 29a provided on the back surface of the seatback 29 is located between the first and second seats. Thus, an occupant seated on the first seat 14 or the second seat 16 can use the cup holder 29a. The back surface of the seat back 29 can be used as a table surface unless an excessive load is applied thereto. In addition, the top surface of the cover member 8 slidingly moved on the storage box 10 frontward can be used as a table surface.

In the state illustrated in FIG. 5D, the storage box 10 is folded, and the seatback 29 for the center seat 20 is turned toward the second seat 16. Thus, an adequate walk-through space can be assured without the operation for retracting the storage box 10 in the space under the seat cushion 14A of the first seat 14.

In the state illustrated in FIG. 5E, the cover member 8 is slidingly moved rearward to open the storage box 10. FIG. 5F shows the seats in FIG. 5E, as seen from an obliquely rearward direction. As seen from FIG. 5F, the cover member 8 protrudes rearward from the first and second seats 14, 16. Thus, an occupant seated on a seat located at the rear of the first and second seat 14, 16 can use the top surface of the cover member 8 as a table surface.

As mentioned above, according to the first embodiment, each of the storage box 10 and the center seat 20 can be selectively moved to take either one of the use position between the first and second seats 14, 16 and the retracted position in the space under the seat cushion 14A, 16A without any difficulty.

Further, according to the first embodiment, the storage box 10 can be folded, and thus, an adequate walk-through space can be assured between the first and second seats 14, 16 without the operation for retracting the storage box in the space under the seat cushion 14A. Further, even if the first seat 14 is used, for example, an occupant is seated on the first seat 14, or a child seat is attached to the first seat 14, the need for forcing the occupant to stand up or detaching the child seat can be advantageously eliminated.

Furthermore, according to the first embodiment, the storage box 10 includes the cover member 8 designed to allow a top surface to be used as a table surface, and to be slidingly moved in both the frontward/rearward directions of the vehicle. Thus, as described in connection with FIGS. 5A to 5F, various use modes can be achieved according to the situation of occupants.

Other embodiments of the present invention will be described below. In the following embodiments, the same component or element as that in the first embodiment is defined by the same reference numeral or code, and its description will be omitted.

Second Embodiment

In the first embodiment, the storage box 10 is retracted in the space 14a under the seat cushion 14A of the first seat 14 without the operation for folding the storage box 10. In this case, the size of the storage box 10 may be restricted depending on the limited volume of the space 14a under the seat cushion 14A. As means for solving this problem, a second embodiment of the present invention provides a combination structure of storage box and center seat capable of retracting a storage box in a folded state to assure a relatively large size in the storage box.

Figure 6:
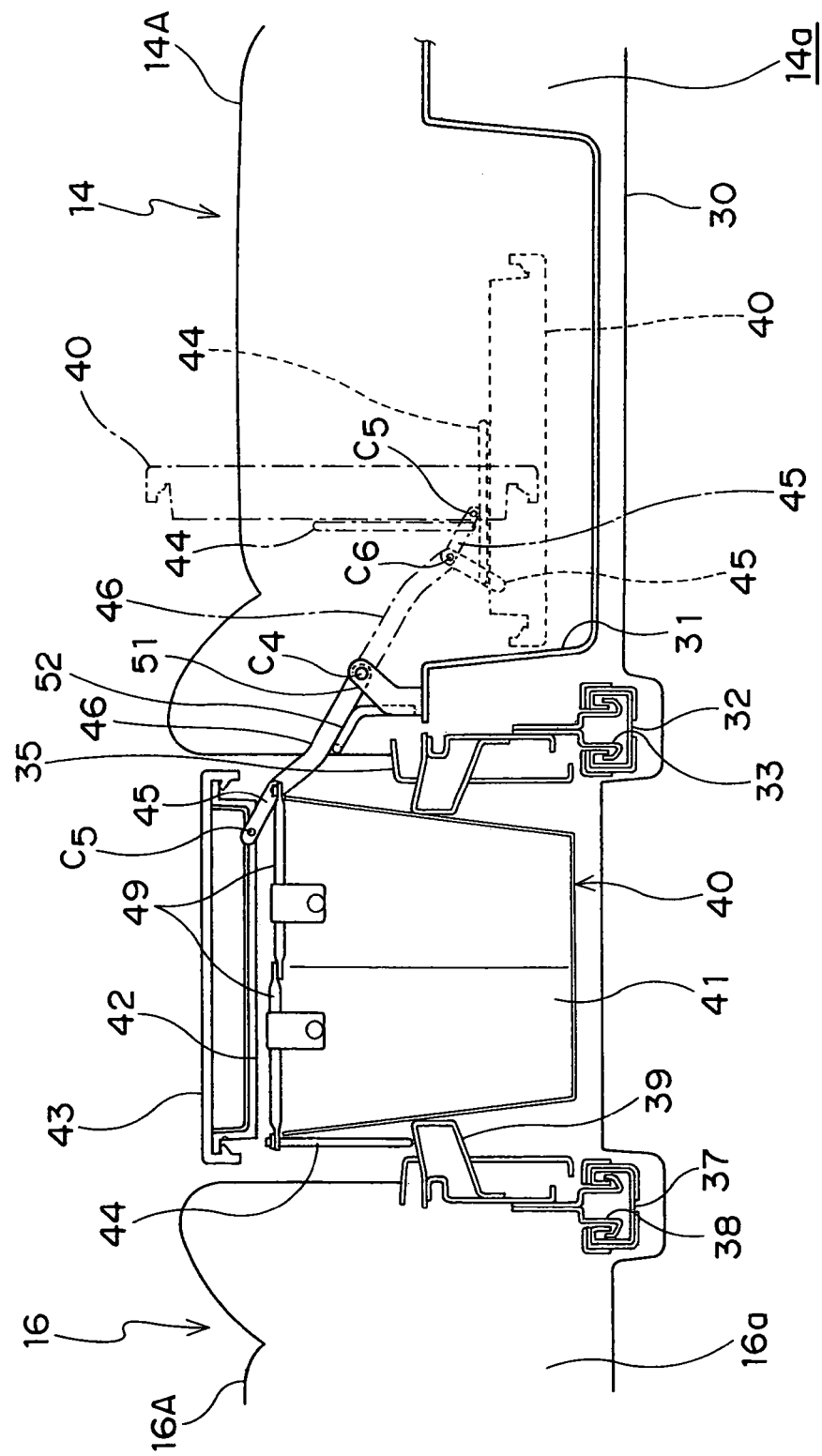
FIG. 6 is an explanatory diagram showing a support mechanism for selectively moving each of a storage box and a center seat to either one of a use position and a retracted position, in accordance with a second embodiment of the present invention.

FIG. 6 is an explanatory diagram showing a support mechanism for moving a storage box 40 between a use position and a retracted position. While this embodiment includes the same center seat 20 and support mechanism thereof as those in the first embodiment, these are omitted in FIG. 6. In FIG. 6, the respective postures of the storage box 40 in the process of moving the storage box 40 from the use position to the retracted position are indicated by solid lines, dash-dotted lines and dotted line. The storage box 40 is connected to a first seat 14 through a link member 46. The link member 46 is connected to the storage box 40 at one end in such a manner that it can be rotationally moved about an axis $C_6$ extending along the longitudinal direction of a vehicle, and connected to a pivotal support member 51 at the other end in such a manner that it can be rotationally moved about an axis $C_4$ extending along the longitudinal direction of the vehicle. The pivotal support member 51 is fixed to a base member 31 defining a part of a space under a seat cushion 14A of a first seat 14. Fundamentally, the storage box 40 is moved in the width direction of the vehicle in conjunction with the rotational movement of the link member 46 relative to the pivotal support member 51. The pivotal support member 51 has a stopper member 52 attached thereto to regulate the rotational movement of the link member 46 toward a seat 16 (or in a taking-out direction) during the movement of the storage box 40.

Figure 7:
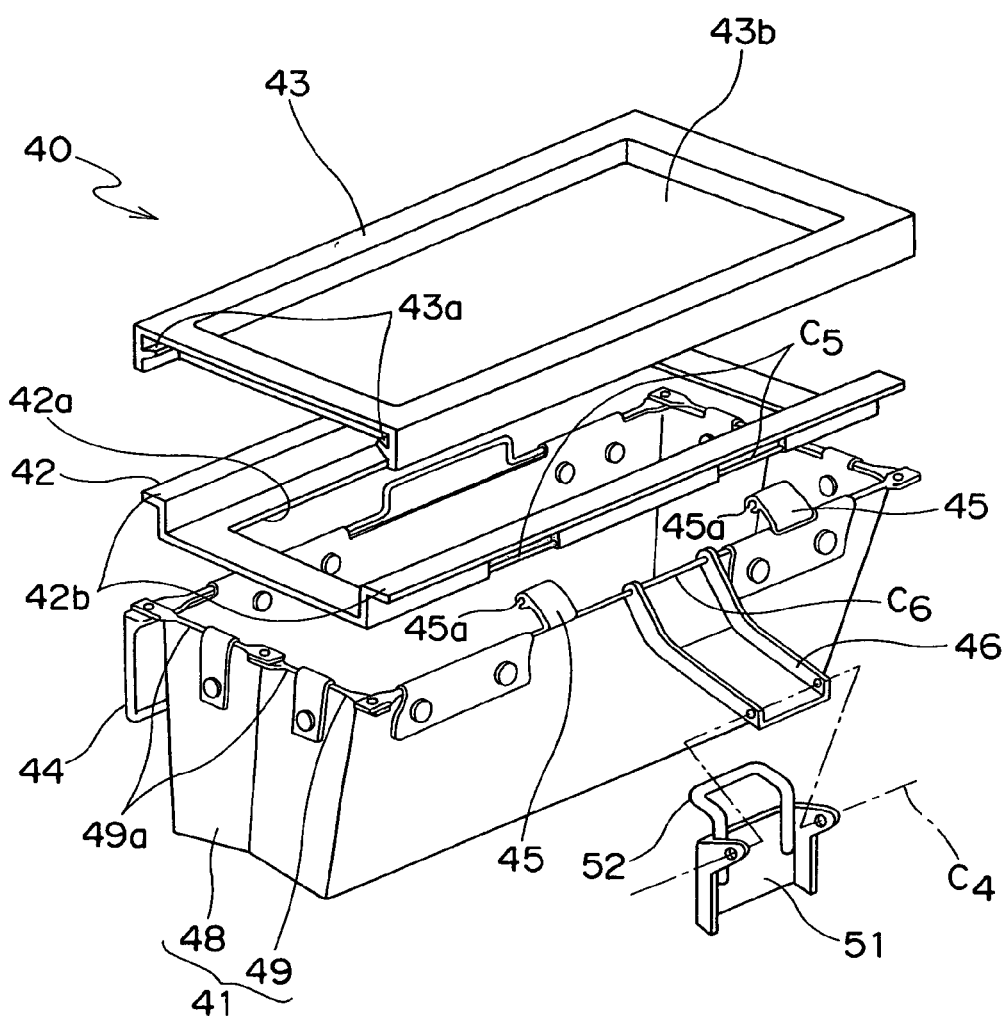
FIG. 7 is a perspective view showing the storage box in the second embodiment and a structure for connecting the storage box to a seat.

FIG. 7 shows the storage box 40 and a structure for connecting the storage box 40 to the first seat 14. As with the first embodiment, the storage box 40 comprises a box body 41 including a rectangular parallelepiped-shaped cloth housing 48 with a top opening, an approximately rectangular frame 49 attached to the housing 48 along the periphery of the opening thereof, an opening member 42 extending along the periphery of the opening of the box body 41, and a cover member 43 for opening and closing the inlet of the storage box 40. Through means of a foldable structure of shaft members 49a constituting the side edges of the frame 49 along the vehicle width direction, the box body 41 can be folded to have a narrowed width in the vehicle width direction.

The link member 46 connecting the storage box 40 and the first seat 14 is rotatably connected to a shaft member (the axis of this shaft member is indicated by $C_6$) constituting the edge of the frame 49 along the longitudinal direction of the vehicle and on the side of the first seat 14. A pair of clip members 45 are fixed to this shaft member. Each of the clip members 45 extends obliquely upward in a direction getting away from the first seat 14, and has a terminal end formed with a shaft support clip 45a. Correspondingly to the shaft support clips 45a, the side surface of the opening member 42 on the side of the first seat 14 is provided with a shaft member (the axis of this shaft member is indicated by $C_5$)

along the longitudinal direction of the vehicle. The box body 41 and the opening member 42 are connected with each other through the engagement between the shaft members thereof and the shaft support clips 45a. In the state after the box body 41 and the opening member 42 are connected together, the opening member 42 can be rotationally moved about the axis $C_5$ with respect to the box body 41.

As with the first embodiment, the opening member 42 includes an opening portion 42a serving as an inlet of the storage box 40, and a pair of flanges 42b extending along the opposite side edges in the longitudinal direction of the vehicle. The flanges 42b are provided to allow the cover member 43 for opening and closing the inlet (the opening portion 42a of the opening member 42) of the storage box 40 to be attached to the opening member 42. Correspondingly, the opposite side edges of the cover member 43 extending in the longitudinal direction of the vehicle are formed with a pair of channels 43a for receiving the corresponding flanges 42b therein. The cover member 43 is attached to the opening member 42 while receiving the flanges 42b of the opening member 42 in the corresponding channels 43a, so that cover member 43 can be slidingly moved in the longitudinal direction of the vehicle. The cover member 43 attached to the opening member 42 can be used as a table. From this point of view, the top surface of the cover member 43 is formed with a depressed portion 43b for preventing an object placed on the top surface of the cover member 43 from slipping off.

Further, a positioning frame 44 having a lower edge extending horizontally is attached to the box body 41 on the other side of the side surface with the link member 52 attached thereto (side surface far from the first seat 14). As shown in FIG. 6, when the storage box 40 is in the use position, the lower edge of the positioning frame 44 is placed on a support rail 39 horizontally extending on the lower portion of the side surface of the second seat 16. The storage box 40 in the use position can be supported in the horizontal posture by placing the positioning frame 44 on the support rail 39.

In the storage box 40 constructed as above, the folding operation is completed by folding the box body 41 to have a narrowed width in the vehicle width direction, and then rotationally moving the opening member 42 and the cover member 43 to a position where the members 42 and 43 are opposed to the folded box body 41. The storage box 40 can be adequately held in the folded state without being spread by the dead weights of the opening member 42 and the cover member 43.

Figure 8:
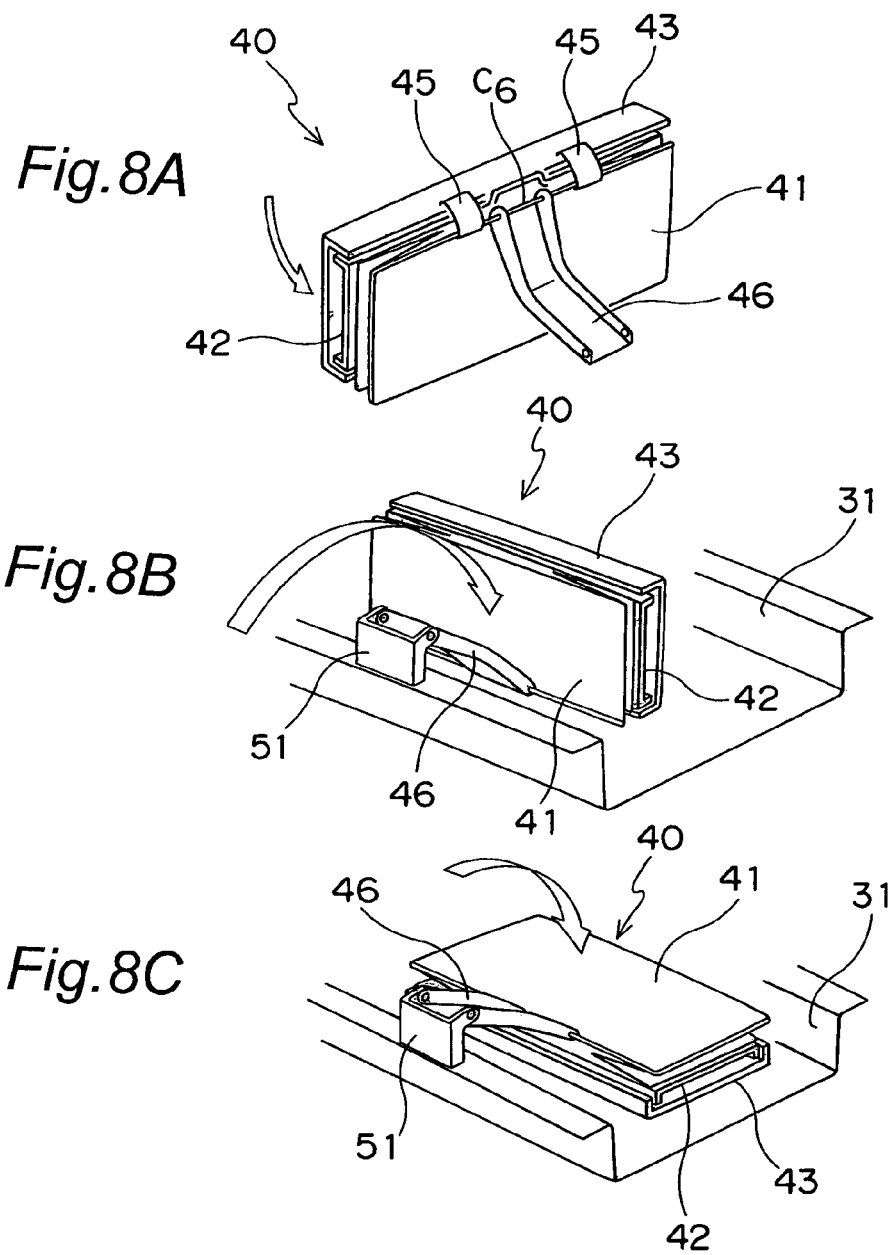
FIGS. 8A to 8C are explanatory perspective views of an operation for folding and retracting the storage box in the second embodiment.

FIGS. 8A to 8C are perspective views showing the respective postures of the storage box 40 in a period between the operation for folding the storage box and the operation for retracting the storage box in the space under the seat cushion 14A. In the state illustrated in FIG. 8A, the storage box 40 is folded and located between the first and second seats 14, 16 (see FIG. 6) in an upright posture by folding the box body 41 and then rotationally moving the opening member 42 and the cover member 43 to a position opposed to the folded box body 41.

As shown in FIG. 8B, the storage box 40 is located on the base member defining a part of the space under the seat cushion 14A of the first seat 14, in an upright posture, by rotationally moving the link member 46 relative to the pivotal support member 51 from the state illustrated in FIG. 8A. This posture corresponds to that indicated by dash-dotted line in FIG. 6.

Then, the storage box 40 takes a retracted position as shown in FIG. 8C by turning over the storage box 40 on the base member 31 from the state illustrate in FIG. 8B As mentioned above, according to the second embodiment, the same effects as those in the first embodiment can be obtained. In addition, the storage box 40 can be retracted in the folded state. Thus, the storage box can be formed to have a relatively large size without depending significantly on the limited space under the seat cushion 14A.

Third Embodiment

Figure 9:
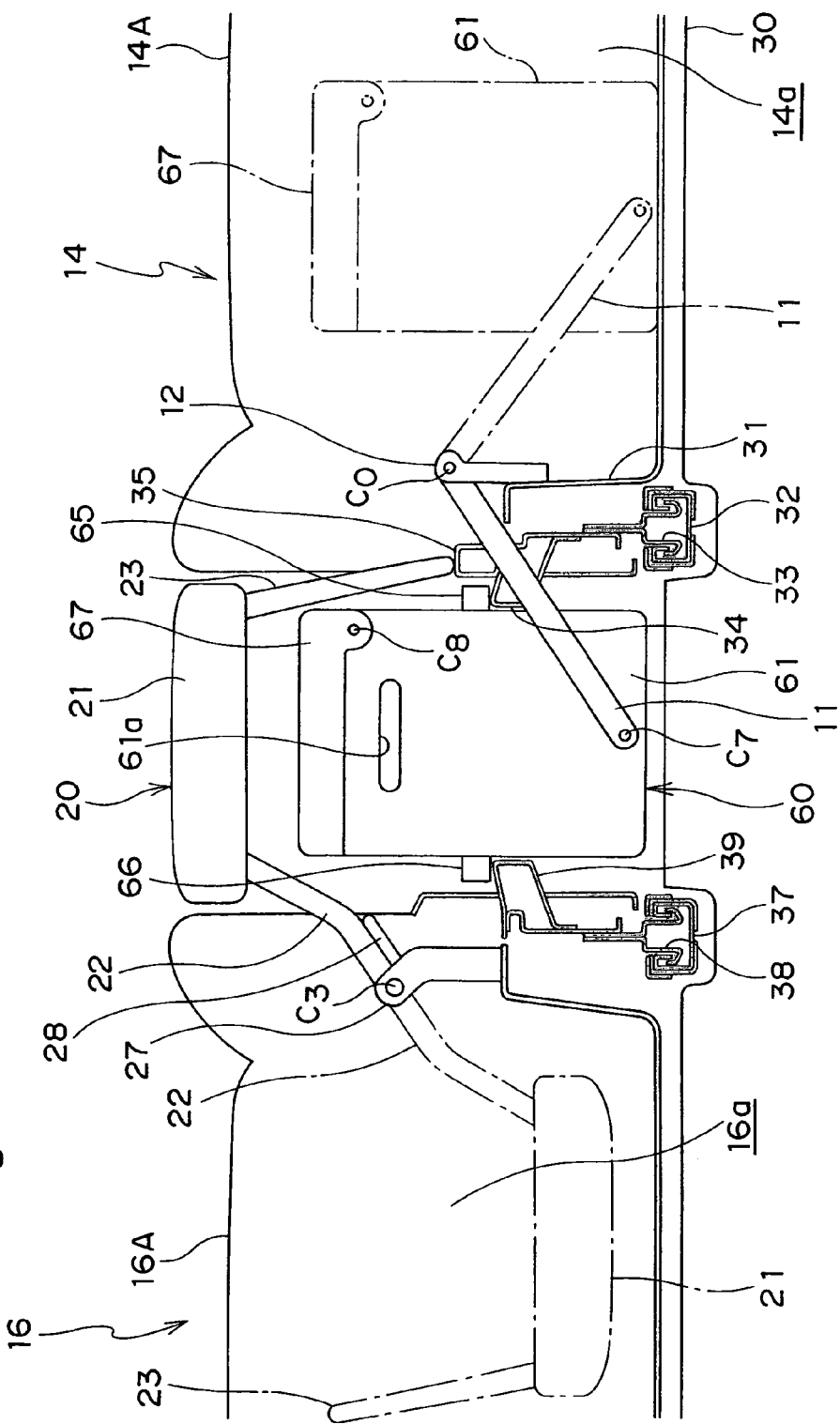
FIG. 9 is an explanatory diagram showing a support mechanism for selectively moving each of a storage box and a center seat to either one of a use position and a retracted position, in accordance with a third embodiment of the present invention.

A third embodiment is constructed by employing a storage box made of resin. FIG. 9 is an explanatory diagram showing a support mechanism for selectively moving each of a storage box 60 and a center seat 20 to either one of a use position and a retracted position, in accordance with the third embodiment of the present invention. In FIG. 9, each of the storage box 60 and the center seat 20 in the use position between a pair of seats 14, 16 arranged in the width direction of a vehicle while a given space left therebetween is indicated by solid lines, and each of the storage box 60 and the center seat 20 in the retracted position in the space 14a, 16a under the seat cushion 14A 16A of the seats 14, 16 is indicated by dash-dotted lines. As with the first embodiment, the storage box 60 is connected to the first seat 14 through a pair of link members 11.

Figure 10:
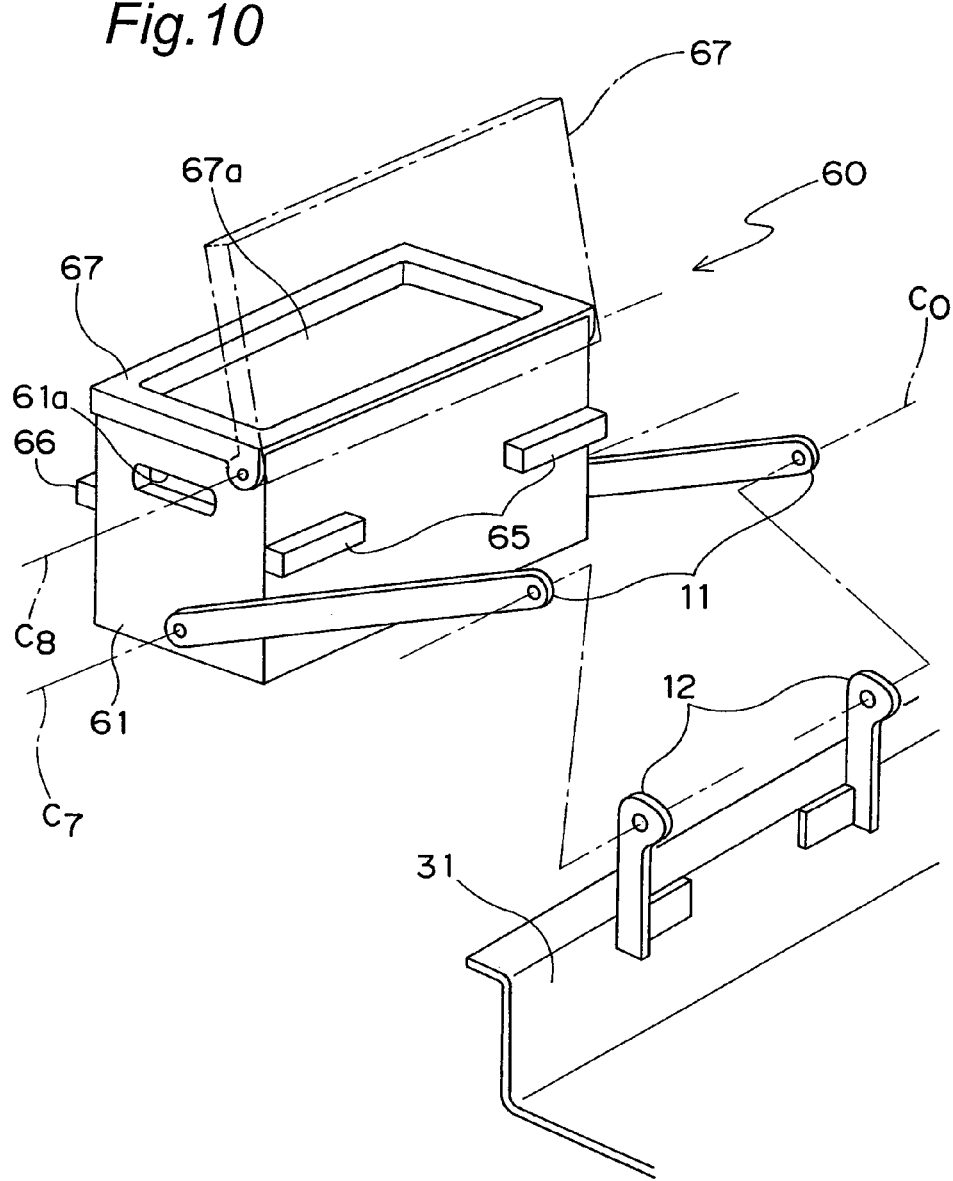
FIG. 10 is a perspective view showing the storage box in the third embodiment and a structure for connecting the storage box to a seat.

FIG. 10 is a perspective view showing the storage box 60 and a structure for connecting the storage box 60 to the first seat 14. The storage box 60 includes a resin box body 61 with a top opening. The box body 61 has front and rear surfaces each formed with an oval-shaped opening 61 a serving as a grip used in retracting and taking out the storage box 60. The material of the storage box 60 is not limited to resin, and any other suitable material, such as metal, may be used.

The link members 11 are connected to the corresponding lower end portions of the front and rear surfaces of the box body 61 in such a manner that they can be rotationally moved about an axis $C_7$. Each of the link members 11 is rotatably connected to the storage box 60 and a pivotal support member 12. When the link members 11 are rotationally moved about an axis $C_0$ with respect to the pivotal support member 12, the storage box 60 is moved between the use position and the retracted position in the space 14a under the seat cushion 14A. During this movement, the link members 11 are rotationally moved relative to the storage box 60 to hold the storage box 60 in a horizontal posture.

Further, a cover member 7 for opening and closing the opening the box body 61 is connected to the upper end portion of each of the front and rear surfaces of the box body 61 and the first seat 14 in such a manner that it can be rotationally moved about an axis (indicated by $C_8$) extending along the. longitudinal direction of the vehicle. When this cover member 7 closes the box body 61, it can be used as a table. From this point of view, the top surface of the cover member 7 is formed with a depressed portion 67a for preventing an object placed on the top surface of the cover member 7 from slipping off.

The side surface of the box body 61 opposed to the first seat 14 is formed with positioning ribs 65 extending horizontally. As seen from FIG. 9, when the storage box 60 is in the use position, the positioning ribs 65 are placed on a support rail 34 horizontally extending on the lower portion of the side surface of the first seat 14 capable of receiving the storage box 60 therein. Further, in the same manner, the side surface of the box body 61 that does not directly face the first seat 14 is formed with positioning ribs 66 extending horizontally (on the side far from the first seat 14). When the storage box 60 is in the use position, the positioning ribs 66 are placed on a support rail 39 horizontally extending on the lower portion of the side surface of the second seat 16 capable of receiving the center seat 20 therein. In the use position, the storage box 60 is supported in the horizontal posture by placing the positional ribs 65, 66 on the corresponding support rails 34, 39.

FIGS. 11A to 11E are explanatory views of various use positions of the storage box 60 and the center seat 20. In the state illustrated in FIG. 11A, the storage box 60 and the center seat 20 are retracted in the spaces under the first and second seats 14, 16, respectively. In the state illustrated in FIG. 11B, the seat cushion 14A of the first seat 14 is lifted to take out the storage box 60, and thereby the space under the seat cushion 14A is opened. The storage box 60 is set up in the use position as shown in FIG. 11C after being moved to between the first and second seats 14, 16 from the positions in FIG. 11B through the aforementioned support mechanism.

In the state illustrated in FIG. 11D, the seat cushion 16A of the second seat 16 is lifted to take out the center seat 20, and thereby the space under the seat cushion 16A is opened. The center seat 20 is set up in the use position above the storage box 60 as shown in FIG. 11E after being moved to between the first and second seats 14, 16 from the positions in FIG. 11D through the aforementioned support mechanism. In this state, the center seat 20 can be used in combination with the seatback 29 provided between the seatbacks 14B, 16B of the first and second seat 14,16.

In the third embodiment, the storage box 60 and the center seat 20 are selectively moved to take either one of the use positions between the first and second seats 14, 16 and the retracted position in the spaces under the seat cushion 14A, 16A, through the aforementioned support mechanism. Thus, the storage box 60 and the center seat 20 can be readily set up, and an adequate walk-through space can be readily assured between the first and second seats 14,16.

It is understood that the present invention is not limited to the above specific embodiments, and various modifications and alternations in design may be made without departing the spirit and scope of the present invention.

What is claimed is:

1. A storage box structure for use with a vehicle equipped with first and second seats, each of which has a seat cushion and a seatback and which is arranged in the width direction of said vehicle while leaving a given space therebetween, said storage box structure comprising:

a storage box having a box body with a top opening, said storage box being formed in a configuration capable of being disposed between said first and second seats in said width direction; and a first support mechanism supporting said storage box in such a manner that said storage box can selectively take either one of a use position where said storage box is located between said first and second seats and a retracted position where said storage box is retracted to provide a space between said first and second seats, wherein each of said first and second seats includes a base member, and a seat cushion body which is positioned on the base member to cover said base member from above said base member and support an occupant seated thereon, and the base member of said first seat includes a receiving space with a top opening to receive said storage box therein;

the base member of said first seat includes a wall formed at the end on an inner side in the width direction of said vehicle so that an upper end of said wall is positioned above a lower end of said storage box in said retracted position;

the first support mechanism supports the storage box allowing the storage box to move rotatably about an axis provided on said wall in the width direction of said vehicle between the use position and the retracted position;

the second seat comprises a support portion formed on the side facing the first seat, said support portion projecting toward the first seat; and the storage box comprises a positioning member formed on the side, which includes a vertical length shorter than that of said storage box and is supported on said support portion in said use position.

2. The storage box structure as defined in claim 1, wherein said support mechanism is designed to allow said storage box to be moved to below the seat cushion of said first or second seat so as to take said retracted position.

3. The storage box structure as defined in claim 1, wherein said seat cushion body is pivoted rotatably about an axis extending along said width direction at a front end portion thereof to open and close the top opening of the receiving space defined by said base member.

4. The storage box structure as defined in claim 1, wherein said storage box includes a width change mechanism for narrowing the width of said box body in said width direction when said storage box is in said use position.

5. The storage box structure as defined in claim 4, wherein said support mechanism is designed to allow said storage box to be turned over so that said narrowed width of said box body extends along a vertical direction in said retracted position.

6. The storage box structure as defined in claim 1, wherein said storage box includes a cover member attached to said box body slidably in the longitudinal direction of said vehicle to open and close the top opening of said box body, said cover member having a top surface designed to be used as a table when said storage box is in said use position.

7. The storage box structure as defined in claim 6, wherein a center-seat seatback for a center seat is located between the respective seatbacks of said first and second seats and pivoted at a lower end thereof to allow said center-seat seatback to be turned down in the frontward direction of said vehicle, and a back surface thereof is designed to be used as a table when said center-seat seatback is turned down in said frontward direction.

8. The storage box structure as defined in claim 6, wherein said vehicle includes a rear seat disposed at the rear of said first and second seats, wherein said cover member is designed to be slidingly moved in front of said rear seat.

9. A combination structure of storage box and center seat for use with a vehicle equipped with a first seat having a first seat cushion and a first seatback, and a second seat having a second seat cushion and a second seatback, said first and second seats being arranged in the width direction of said vehicle while leaving a given space therebetween, said combination structure of storage box and center seat comprising:

a storage box having a box body with a top opening, said storage box being formed in a configuration capable of being disposed between said first and second seats in said width direction;

a first support mechanism supporting said storage box in such a manner that said storage box can selectively take either one of a use position where said storage box is located between said first and second seats and a retracted position where said storage box is located below said first seat cushion;

a center seat having a seat body for supporting an occupant seated thereon, said center seat being formed in a configuration capable of being disposed between said first and second seats in said width direction; and a second support mechanism supporting said center seat in such a manner that said center seat can selectively take either one of a use position where said center seat is located between said first and second seats and a retracted position where said center seat is located below said second seat cushion, wherein each of said first and second seats includes a base member, and a seat cushion body which is positioned on the base member to cover said base member from above said base member and support an occupant seated thereon, and the base member of said first seat includes a receiving space with a top opening to receive said storage box therein while the base member of said second seat includes a receiving space with a top opening to receive an auxiliary seat therein;

the first support mechanism is mounted on the base member of the first seat to support the storage box allowing the storage box to move rotatably about an axis provided on said base member in the width direction of said vehicle between the use position and the retracted position; and the second support mechanism is mounted on the base member of the second seat to support the center seat allowing the center seat to move rotatably about an axis provided on said base member of the second seat in the width direction of said vehicle between the use position and the retracted position.

10. The combination structure of storage box and center seat as defined in claim 9, wherein said second support mechanism is designed to allow the seat body of said center seat to be moved to a position above said storage box when said storage box is in said use position.

11. The combination structure of storage box and center seat as defined in claim 9, wherein said storage box includes a width change mechanism for narrowing the width of said box body in said width direction when said storage box is in said use position.

12. The combination structure of storage box and center seat as defined in claim 11, wherein said first support mechanism is designed to allow said storage box to be moved to said retracted position from said use position while maintaining the width of said box body narrowed.

13. The combination structure of storage box and center seat as defined in claim 9, wherein:

said first seat cushion includes a first seat cushion body designed to be movable to cover said first base member from above said first base member and support an occupant seated thereon, said first seat cushion body being pivoted rotatably about an axis extending along said width direction at a front end portion thereof to open and close the top opening of the first receiving space defined by said first base member; and said second seat cushion includes a second seat cushion body designed to be movable to cover said second base member from above said second base member and support an occupant seated thereon, said second seat cushion body being pivoted rotatably about an axis extending along said width direction at a front end portion thereof to open and close the top opening of the second receiving space defined by said second base member.

14. The combination structure of storage box and center seat as defined in claim 9, wherein said storage box includes a cover member attached to said box body slidably in the longitudinal direction of said vehicle to open and close the top opening of said box body, said cover member having a top surface designed to be used as a table when said storage box is in said use position.

15. The combination structure of storage box and center seat as defined in claim 14, wherein a center-seat seatback for said center seat is located between said first and second seatbacks and pivoted at a lower end thereof to allow said center-seat seatback to be turned down in the frontward direction of said vehicle, and a back surface thereof is designed to be used as a table when said center-seat seatback is turned down in said frontward direction.

16. The combination structure of storage box and center seat as defined in claim 14, wherein said vehicle includes a rear seat disposed at the rear of said first and second seats, wherein said cover member is designed to be slidingly moved in front of said rear seat.

17. The combination structure of storage box and center seat as defined in claim 9, wherein said second support mechanism supports a seat cushion of said auxiliary seat;

the base member of the second seat is designed to receive said auxiliary seat; and a seatback of said auxiliary seat is supported to move rotatably by said second seatback of the second seat.

18. The combination structure of storage box and center seat as defined in claim 9, wherein the second seat comprises a second support portion formed on the side facing the first seat, said second support portion projecting toward the first seat;

the first seat comprises a first support portion formed on the side facing the second seat, said first support portion projecting toward the second seat;

the storage box comprises a positioning member formed on the side, the positioning member being designed to be supported by said second support portion in said use position; and the auxiliary seat comprises a leg member formed on the side, the leg member being designed to be supported by said first support portion in said use position.

19. The combination structure of storage box and center seat as defined in claim 9, wherein slide rails are provided below said first and second seats allowing said first and second seats to move slidably along longitudinal direction of the vehicle.

20. A storage box structure for use with a vehicle equipped with first and second seats, each of which has a seat cushion and a seatback and which is arranged in the width direction of said vehicle while leaving a given space therebetween, sad storage box comprising:

a storage box having a box body with a top opening, said storage box being formed in a configuration capable of being disposed between said first and second seats in said width direction; and a first support mechanism supporting said storage box in such a manner that said storage box can selectively take either one of a use position where said storage box is located between said first and second seats and a retracted position where said storage box is retracted to provide a space between said first and second seats, wherein each of said first and second seats includes a base member, and a seat cushion body which is positioned on the base member to cover said base member from above said base member and support an occupant seated thereon, and the base member of said first seat includes a receiving space with a top opening to receive said storage box therein;

the base member of said first seat includes a wall formed at the end on an inner side in the width direction of said vehicle so that an upper end of said wall is positioned above a lower end of said storage box in said retracted position;

the first support mechanism supports the storage box allowing the storage box to move rotatably about an axis provided on said wall in the width direction of said vehicle between the use position and the retracted position;

the second seat comprises a support portion formed on the side facing the first seat, said support portion projecting toward the first seat and extending along longitudinal direction of the vehicle;

the storage box comprises a positioning member formed on the side, which is supported on said support portion in said use position; and the base members of said first and second seats are connected to a floor panel via slide rails allowing said first and second seats to move slidably along longitudinal direction of the vehicle.

* * * * *